March 23, 1965  DAIJIRO MATSUI  3,175,134
VARIABLE CAPACITOR
Filed Oct. 23, 1962
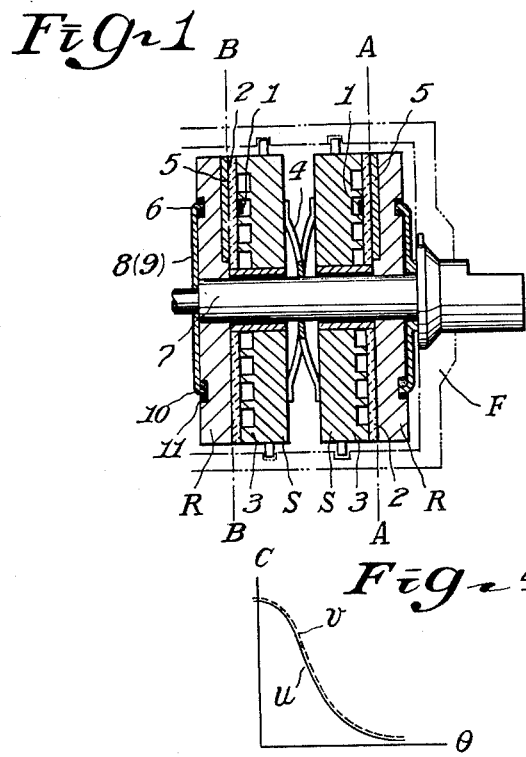
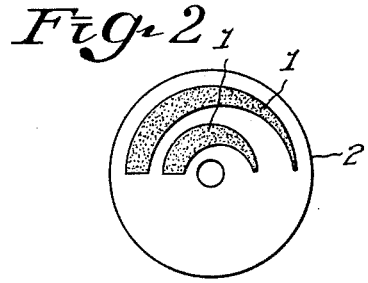
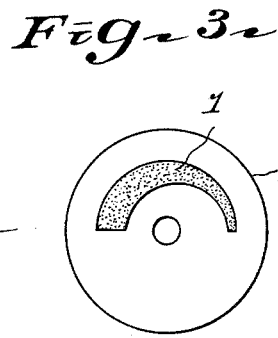
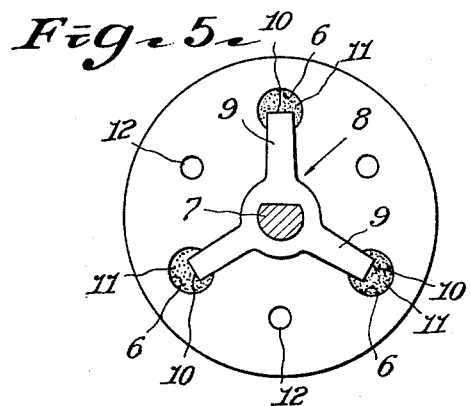
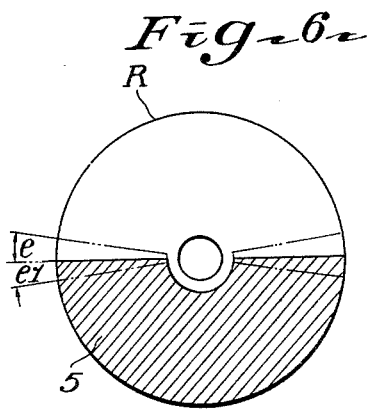

United States Patent Office

3,175,134
Patented Mar. 23, 1965

3,175,134
VARIABLE CAPACITOR
Daijiro Matsui, Ota-ku, Tokyo-to, Japan, assignor to Kabushiki Kaisha Toko Radio Coil Kenkyusho, Tokyo-to, Japan, a joint-stock company of Japan
Filed Oct. 23, 1962, Ser. No. 232,528
Claims priority, application Japan, Nov. 7, 1961 (utility model), 36/54,703
2 Claims. (Cl. 317—249)

This invention relates to electrical variable capacitors of the rotor-stator type, and more particularly it relates to a new and improved, micro-miniature variable capacitor with excellent features for such uses as that in singe or multiband broadcast transistor radios.

Among miniature variable capacitors utilized for use with such components as transistors, there is a type, known to the prior art, wherein a capacitor electrode printed on one side of a thin plate of a high dielectric material (hereinafter referred to merely as "ceramic plate"), such as a ceramic, is disposed so as to confront an opposite capacitor electrode which is slidably movable at the other side of the said ceramic plate, and the two electrodes are so adapted that one electrode can be rotated relative to the other with the ceramic plate therebetween so as to vary the overlapping area between the two electrodes. Furthermore, the bonding of two or more electrodes, which are mutually independent, onto one surface of the ceramic plate for the purpose of using the capacitor for a single or multiband use has also been proposed.

It is an object of the invention to provide such a capacitor as defined above which has a simple and compact construction.

It is a further object to provide simple and effective means for preadjusting the angular relation of each rotor to the shaft.

Said objects and other objects of the present invention have been attained by a variable capacitor comprising: a plurality of rotor-stator sets, wherein the rotors of all said sets are supported on and fixed to a common shaft, and the rotor and stator of each said set have a pair of mutually opposed capacitor electrodes with a thin plate of a high dielectric material interposed therebetween, the capacitance between the said electrodes being variable by rotation of the electrode or electrodes on the rotor, in sliding contact with the said thin plate, relative to the electrode on the stator; means for maintaining positive and constant pressure between each rotor and its corresponding stator; and means for positively locking the said rotors to the said shaft, which, at the time of assembly of the capacitor, permits preadjustment of the angular setting of the rotors relative to the shaft so as to cause the capacitances of all said rotor-stator sets for any angle of rotation of the shaft to be equal.

The nature and details of the invention, as well as the manner in which the foregoing objects may best be achieved will be more clearly apparent by reference to the following detailed description of a representative embodiment of the invention when taken in conjunction with the accompanying illustrations in which like parts are designated by the reference numerals and letters, and in which:

FIG. 1 is a sectional view taken along a plane passing through the centerline of an embodiment of the variable capacitor according to the present invention;

FIG. 2 is a front surface view in the axial direction of a ceramic plate bearing two electrodes in the embodiment of FIG. 1;

FIG. 3 is a front surface view in the axial direction of a ceramic plate bearing a single electrode, said plate being used in another embodiment of the present invention;

FIG. 4 is a graphical representation indicating the relation between angle of rotation and capacitance of a variable capacitor according to the present invention;

FIG. 5 is a rear surface view of a rotor according to the present invention, showing the manner of adjustably fixing the said rotor to the shaft; and FIG. 6 is a front surface view of a rotor of FIG. 5, showing its electrode.

The variable capacitor according to the invention comprises essentially; two, or more when necessary, ceramic plates, each having a single electrode as shown in FIG. 3; opposite electrodes corresponding to the said electrodes on the ceramic plates; a common rotatable shaft, the said ceramic plates being used together and combined with their respective opposite electrodes on the said common shaft; and means for facilitating the adjustment for the purpose of obtaining coincidence of the curves of the capacitances of the pairs of opposite electrodes versus the angle of rotation of the said common shaft, the said coincidence being an important requisite in this case.

Referring to the drawings, the embodiment illustrated in FIG. 1 has two stators S, each of which consists of a ceramic plate 2 bearing an electrode 1 bonded to the inner surface thereof and a supporting member 3, the electrode 1 being interposed between the ceramic plate 2 and the supporting member 3. The two stators S are disposed in mutually symmetrical and coaxial arrangement with a spring 4 interposed therebetween so as to press the two stators outwardly, the said ceramic plates 2 being on the outer sides of the stators S and S.

Rotors R, each being an electrode 5, are fixed on a common shaft 7 so that their electrodes 5 are in slidable contact with the outer surfaces of the ceramic plates 2 of the stators S, the said shaft 7 passing unrestrained through holes in the stators S. The stators S, which are thus coaxially disposed relative to the rotors R, are pressed by the spring 4 against their respective rotors.

The manner in which the rotors R are fixed to the common shaft 7 is an essential and important aspect of the present invention. In the instant embodiment, the rear surface, that is, the outer surface in assembled state, of each rotor R is provided with a plurality of depressions or flat-bottomed holes 6. A fastening member 8 having a plurality of legs 9, each with a perpendicularly bent tip 10 for fitting loosely into one of the holes 6, is provided to fit onto and be locked to the shaft 7, the number of the legs 9 being the same as the number of the aforesaid holes 6 in each rotor R. At the time of assembly, the bent tips 10 of the fastening member 8 are fitted into their respective holes 6. The widths of the tips 10 are made sufficiently small with respect to their holes 6 so as to afford a sufficient angular range for preadjustment of the relative angle in the direction of rotation between each rotor and the shaft. After this preadjustment, the remaining void in each hole 6 is filled with a cementing substance 11, whereby the tips 10 are firmly imbedded and anchored in their holes 6, and the rotor R is positively locked to the shaft 7.

The variable capacitor of the above construction has the following operational features. When the rotatable shaft 7 is rotated, the rotors R fixed to this shaft 7 rotate together in sliding contact with the surfaces A and B of the ceramic plates 2, whereby the overlapping area of each electrode 1 and its corresponding opposite electrode 5 and, therefore, the capacitance are varied.

In the case of a variable capacitor wherein two pairs of opposed electrodes are varied in capacitance by means of a common shaft as described above, particularly when such a variable capacitor is to be applied to two-band or multiband use, it is an important requisite that the capacitances C of the two pairs of opposed electrodes at various angle of rotation of the common shaft be equal as indicated in FIG. 4. That is, it is an important condition that adjustment be made so that the curve $u$ of the capacitance of the first pair of opposed electrodes coincides with the curve $v$ of the capacitance of the second pair (FIG. 4). This condition can be easily fulfilled at the time of assembly by the unique means of locking the rotors R to the common shaft 7 as has been mentioned hereinbefore.

More specifically, the first rotor is first fixed to the shaft 7. Then the stators and the second rotor are fitted successively onto the shaft 7, and the resulting partial assembly is fitted into the capacitor frame structure F. To fix the second rotor to the shaft, the fastening member 8 is fitted onto the shaft 7, and the tips 10 of its legs 9 are placed in the holes 6. Since, as was aforementioned, the said tips 10 have a certain range of adjustable movement in their holes 6, the angular position of the electrode 5 of this rotor R can be preadjusted within a range $e+e_1$ as indicated in FIG. 6. This adjustment is so made as to cause the capacitance curve $v$ of the second pair of opposed electrodes to coincide with curve $u$ of the first pair of opposed electrodes (adjusting holes 12 being provided to facilitate this adjustment). Thereafter, a cementing substance 11 such as, for example, an adhesive or a synthetic resin, is placed in the holes 6 so as to anchor the tips 10 firmly, thereby positively locking the rotor to the shaft 7. The range $(e+e_1)$ merely serves to show the possible angular range within which the adjustment can be made prior to cementing tips 10 in holes 6.

By the construction according to the present invention as described above, a micro-miniature variable capacitor for single or multiband use which has excellent performance, electrodes for varying angle of rotation of the common shaft are matched, is produced.

Although this invention has been described with respect to a particular embodiment thereof, it is not to be so limited as changes and modifications may be made therein which are within the full intended scope of the invention, as defined by the appended claims.

What is claimed is:

1. A variable capacitor comprising, in combination, a plurality of rotor and stator sets; a common shaft for all rotors, each rotor and stator set being provided with a pair of mutually opposed electrodes; and a thin ceramic plate interposed therebetween; means for maintaining constant positive pressure between each rotor and stator; means for positively locking said rotors to said shaft, said means comprising a plurality of depressions in the outer flat surface of at least one of the rotors, a fastening member lockable on said shaft and having a plurality of legs corresponding in number to that of said depressions and provided with bent tips, said tips being fixed in said depressions, said depressions being sufficiently large relative to said bent tips to permit, at the time of assembly of the capacitor, preadjustment of the setting of the rotors relative to the shaft so as to cause the capacitances of all rotor-stator sets to be equal for any angle of rotation of the shaft.

2. A variable capacitor comprising, in combination, two sets of opposing rotor-stator sets; a common shaft for both rotors; each rotor and stator being provided with a pair of mutually opposed electrodes; and a thin ceramic plate interposed therebetween; spring means between each rotor and stator for maintaining constant positive pressure; means for positively locking said rotors to said shaft, said means consisting of three depressions on the surface of each rotor facing the outer ends of the shaft, a fastening member lockable on said shaft and having three legs with bent tips, said tips being fixed in said depressions, said depressions being sufficiently large relative to said bent tips to permit, at the time of assembly of the capacitor, preadjustment of the setting of the rotors relative to the shaft so as to cause the capacitances of both rotor-stator sets to be equal for any angle of rotation of the shaft.

References Cited by the Examiner
UNITED STATES PATENTS

| 1,661,351 | 3/28 | Van Deventer | 317—249 |
| 2,913,644 | 11/59 | Bleazey | 317—249 |

FOREIGN PATENTS 815,210  10/51  Germany.

LARAMIE E. ASKIN, *Primary Examiner.*

JOHN P. WILDMAN, JOHN F. BURNS, *Examiners.*